(12) United States Patent
Karjala et al.

(10) Patent No.: US 10,370,471 B2
(45) Date of Patent: Aug. 6, 2019

(54) PROCESS TO FORM OIL CONTAINING ETHYLENE-BASED POLYMERS

(71) Applicant: Dow Global Technologies LLC, Midland, MI (US)

(72) Inventors: Thomas W. Karjala, Lake Jackson, TX (US); Jorge Rubalcaba, Pearland, TX (US); Edward O. Madenjian, Lake Jackson, TX (US); Curvel Hypolite, Rosharon, TX (US); Pradeep Jain, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/521,843

(22) PCT Filed: Dec. 18, 2015

(86) PCT No.: PCT/US2015/066854
§ 371 (c)(1),
(2) Date: Apr. 25, 2017

(87) PCT Pub. No.: WO2016/109265
PCT Pub. Date: Jul. 7, 2016

(65) Prior Publication Data
US 2017/0313800 A1  Nov. 2, 2017

Related U.S. Application Data

(60) Provisional application No. 62/097,257, filed on Dec. 29, 2014.

(51) Int. Cl.
*C08F 2/01* (2006.01)
*C08F 2/04* (2006.01)
(Continued)

(52) U.S. Cl.
CPC .............. *C08F 210/18* (2013.01); *B01J 19/18* (2013.01); *B01J 19/2455* (2013.01); *C08F 2/01* (2013.01);
(Continued)

(58) Field of Classification Search
CPC ........ B01J 19/18; B01J 19/2455; C08F 10/02; C08F 210/18; C08F 2/01; C08F 2/04;
(Continued)

(56) References Cited

U.S. PATENT DOCUMENTS 2,875,027 A  2/1959  Dye
3,726,843 A  4/1973  Anolick et al.
(Continued)

FOREIGN PATENT DOCUMENTS

WO  2011041533 A1  4/2011
WO  2013/096573 A1  6/2013
(Continued)

OTHER PUBLICATIONS http://www.lpi-intl.com/tds/sonneborn-plastic-oil-hydrobrite-550-msds.pdf.*
(Continued)

*Primary Examiner* — Satya B Sastri
(74) *Attorney, Agent, or Firm* — Dinsmore & Shohl LLP (57) ABSTRACT

The invention provides a process to form a composition comprising at least one ethylene-based polymer and at least one oil, said process comprising the following: polymerizing a mixture comprising ethylene, and optionally one or more comonomers, in a reactor system, comprising at least one reactor and at least one mixer, located downstream from the reactor, to form the ethylene-based polymer; and wherein the oil is added to the ethylene-based polymer upstream of the mixer. The invention also provides a reactor system for a process to form a composition comprising at least one
(Continued)

ethylene-based polymer and at least one oil, said reactor system comprising at least one reactor, at least one mixer, and an oil feed into the ethylene-based polymer, and wherein the oil feed is located after the reactor and before the mixer.

12 Claims, 3 Drawing Sheets

(51) Int. Cl.
*C08F 6/00* (2006.01)
*B01J 19/18* (2006.01)
*B01J 19/24* (2006.01)
*C08F 10/02* (2006.01)
*C08J 11/02* (2006.01)
*C08L 23/04* (2006.01)
*C08F 210/18* (2006.01)
*C08L 91/00* (2006.01)
*C08L 23/16* (2006.01)

(52) U.S. Cl.
CPC ............... *C08F 2/04* (2013.01); *C08F 6/00* (2013.01); *C08F 6/003* (2013.01); *C08F 10/02* (2013.01); *C08J 11/02* (2013.01); *C08L 23/16* (2013.01)

(58) Field of Classification Search
CPC ... C08F 6/00; C08F 6/003; C08J 11/02; C08L 23/04; C08L 23/16; C08L 91/00
See application file for complete search history.

(56) References Cited

U.S. PATENT DOCUMENTS

| | | | |
|---|---|---|---|
| 3,968,090 A | | 7/1976 | Shimada et al. |
| 4,153,588 A | * | 5/1979 | Makowski ............. C08L 23/32 260/DIG. 31 |
| 5,516,849 A | | 5/1996 | Caines et al. |
| 5,977,251 A | | 11/1999 | Kao et al. |
| 6,545,088 B1 | | 4/2003 | Kolthammer et al. |
| 6,686,419 B2 | | 2/2004 | Wouters et al. |
| 7,910,637 B2 | | 3/2011 | Kiss et al. |
| 7,985,804 B2 | | 7/2011 | Fiscus et al. |
| 2002/0077401 A1 | | 6/2002 | Chaudhary et al. |
| 2009/0076214 A1 | * | 3/2009 | Kiss .................. C08F 10/00 524/570 |
| 2009/0239014 A1 | * | 9/2009 | Noguchi .............. C08F 10/00 428/36.8 |
| 2013/0046061 A1 | * | 2/2013 | Hermel-Davidock ...................... C08F 10/00 525/240 |
| 2013/0341567 A1 | * | 12/2013 | Hyde .................... B01D 15/00 252/364 |

FOREIGN PATENT DOCUMENTS

| | | |
|---|---|---|
| WO | 2014/003857 A1 | 1/2014 |
| WO | 2014084892 A1 | 6/2014 |
| WO | 2016109264 A1 | 7/2016 |

OTHER PUBLICATIONS

P. S. Ravishankar of Exxon (Rubber Chemistry and Technology, vol. 85, No. 3, pp. 327-349, 2012.
P. S. Ravishankar et al., Recent Advances in EPDM and Dynamically Vulcanized Thermoplastic Elastomers, 186th Technical Meeting of Rubber Division, ACS, Nashville, TN, 2014; pp. 1-15.
PCT/US2015/066854, International Search Report and Written Opinion dated Mar. 22, 2016.
PCT/US2015/066854, International Preliminary Report on Patentability dated Jul. 4, 2017.
Search Report and Written Opinion, dated Apr. 30, 2018, related to Singapore Patent Application No. 11201705225Q.
Second Search Report and Written Opinion, dated Mar. 12, 2019, related to Singapore Patent Application No. 11201705225Q.

* cited by examiner

PROCESS TO FORM OIL CONTAINING ETHYLENE-BASED POLYMERS

REFERENCE TO RELATED APPLICATIONS

The present application claims the benefit of U.S. Provisional Application No. 62/097,257, filed Dec. 29, 2014, and incorporated herein by reference.

BACKGROUND OF THE INVENTION

There is a need to prepare high molecular weight (e.g., high Mooney Viscosity), oil-extended, high molecular weight (for example, Mw>200,000 g/mole) ethylene-based polymers that can be successfully isolated from the polymerization reactor. Polymerization processes of the art are described in the following references: U.S. Pat. Nos. 7,910,637; 7,985,804; 5,516,849; 6,686,419; 6,545,088; 3,726,843; U.S. Provisional 62/097,268 (filed Dec. 29, 2014); International Publication Nos. WO2013/096573; WO2014/003857. See also, P. S. Ravishankar et al., treatise on EPDM, *Rubber Chemistry and Technology*, Vol. 85, No. 3, pp 327-349, 2012; P. S. Ravishankar et al., Recent Advances in EPDM and Dynamically Vulcanized Thermoplastic Elastomers, 186th Technical Meeting of Rubber Division, ACS, Nashville, Tenn., 2014; pp. 1-15. However, as discussed above, there remains a need to prepare high molecular weight ethylene-based polymers, which can be readily isolated from the polymerization process. These needs have been met by the following invention.

SUMMARY OF THE INVENTION

The invention provides a process to form a composition comprising at least one ethylene-based polymer and at least one oil, said process comprising the following:

polymerizing a mixture comprising ethylene, and optionally one or more comonomers, in a reactor system, comprising at least one reactor and at least one mixer, located downstream from the reactor, to form the ethylene-based polymer; and wherein the oil is added to the ethylene-based polymer upstream of the mixer.

The invention also provides a reactor system for a process to form a composition comprising at least one ethylene-based polymer and at least one oil, said reactor system comprising at least one reactor, at least one mixer, and an oil feed into the ethylene-based polymer, and wherein the oil feed is located after the reactor and before the mixer.

DETAILED DESCRIPTION OF THE INVENTION

It has been discovered that high molecular weight polymer (for example, Mw>200,000 g/mole), can be produced within one or more reactors, and still successfully processed through the finishing section of the train, by the addition of oil after the reactor, and before a static mixer. The resultant product contains oil and a higher molecular weight polymer that contribute to improved product properties, for example, good mechanical properties and good processing properties. It has been discovered that the resultant high molecular weight, oil-extended polymer product can be processed through one or more devolatilization devices, without a significant amount of oil carry over back to the reactor. The polymer product can be used in applications that require both a high molecular weight for strength, and oil for improved processibility of polymer blends and/or articles of manufacturer.

As discussed above, in one aspect, the invention provides a process to form a composition comprising at least one ethylene-based polymer and at least one oil, said process comprising the following:

polymerizing a mixture comprising ethylene, and optionally one or more comonomers, in a reactor system, comprising at least one reactor and at least one mixer, located downstream from the reactor, to form the ethylene-based polymer; and wherein the oil is added to the ethylene-based polymer upstream of the mixer.

In a second aspect, the invention also provides a reactor system for a process to form a composition comprising at least one ethylene-based polymer and at least one oil, said reactor system comprising at least one reactor, at least one mixer, and an oil feed into the ethylene-based polymer, and wherein the oil feed is located after the reactor and before the mixer.

An inventive process may comprise a combination of two or more embodiments as described herein.

An inventive reactor system may comprise a combination of two or more embodiments as described herein.

The ethylene-based polymer may comprise a combination of two or more embodiments as described herein.

The oil may comprise a combination of two or more embodiments as described herein.

The following embodiments apply to both the first and second aspects of the invention as discussed above.

In one embodiment, the oil has a volatile fraction, at 400° C. and atmospheric pressure, less than, or equal to, 2.0 wt %, further less than, or equal to, 1.8 wt %, further less than, or equal to, 1.6 wt %, based on the total weight of the oil.

In one embodiment, the oil has a volatile fraction, at 400° C. and atmospheric pressure, less than, or equal to, 1.4 wt %, further less than, or equal to, 1.2 wt %, further less than, or equal to, 1.0 wt %, further less than, or equal to, 0.9 wt %, based on the total weight of the oil.

In one embodiment, the oil has a volatile fraction, at 425° C. and atmospheric pressure, less than, or equal to, 5.0 wt %, further less than, or equal to, 4.5 wt %, further less than, or equal to, 4.0 wt % based on the total weight of the oil.

In one embodiment, the oil has a volatile fraction, at 425° C. and atmospheric pressure, less than, or equal to, 3.8 wt %, further less than, or equal to, 3.7 wt %, further less than, or equal to, 3.6 wt %, further less than, or equal to, 3.5 wt %, based on the total weight of the oil.

In one embodiment, the oil has a volatile fraction, at 500° C. and atmospheric pressure, less than, or equal to, 50 wt %, further less than, or equal to, 48 wt %, further less than, or equal to, 46 wt %, further less than, or equal to, 44 wt %, based on the total weight of the oil.

In one embodiment, the mixer is a static mixer. Static mixers include, but are not limited to, helical static mixers, and static mixers containing various baffle designs.

In one embodiment, the polymerization is a solution polymerization.

In one embodiment, the at least one reactor is a continuous stirred tank reactor or a Loop reactor.

In one embodiment, the mixture further comprises a polymerization solvent. In a further embodiment, the reactor system comprises a line for recycled polymerization solvent, and wherein the recycled polymerization solvent is re-introduced into the at least one reactor.

In one embodiment, the ethylene-based polymer is an ethylene/α-olefin interpolymer, further an ethylene/α-olefin/non-conjugated polyene interpolymer, further an ethylene/α-olefin/diene interpolymer, and further an ethylene/α-olefin/diene terpolymer, and further an EPDM.

In one embodiment, the reactor system comprises two reactors. In a further embodiment, the reactor system comprises a stirred tank reactor (e.g., a CSTR) followed by a Loop reactor.

In one embodiment, the oil is injected into the reactor.

In one embodiment, the oil is added at a location outside of the reactor.

In one embodiment, oil is added to the ethylene-based polymer downstream of the at least one reactor.

In one embodiment, the oil is heated to a temperature from 80° C. to 190° C., prior to its addition to the ethylene-based polymer. In a further embodiment, the oil is heated using a post reactor heater. In a further embodiment, the heater comprises one or more static mixing elements.

In one embodiment, the oil is subject to a purification process to remove oxygenates and/or moisture prior to its addition to the ethylene-based polymer.
The process of any one of the previous claims, wherein the difference between the In one embodiment, the difference between the temperature of the oil and the temperature at least one reactor ($T_{oil}-T_{reactor}$) is from 50° C. to 150° C., further from 60° C. to 150° C., further from 70° C. to 150° C.

In one embodiment, the difference between the temperature of the oil and the temperature at least one reactor ($T_{oil}-T_{reactor}$) is from 50° C. to 120° C., further from 50° C. to 100° C., further from 50° C. to 80° C.

In one embodiment, the at least one oil comprises less than, or equal to, 40 wt %, further less than, or equal to, 35 wt %, further less than, or equal to, 30 wt %, based on the weight of the oil, of one or more naphthenics.

In one embodiment, the at least one oil comprises greater than, or equal to, 5 wt %, further greater than, or equal to, 10 wt %, further less greater, or equal to, 15 wt %, based on the weight of the oil, of one or more naphthenics.

In one embodiment, the at least one oil comprises greater than, or equal to, 60 wt %, further greater than, or equal to, 65 wt %, further greater than, or equal to, 60 wt %, based on the weight of the oil, of one or more paraffinics.

In one embodiment, the at least one oil comprises less than, or equal to, 90 wt %, further less than, or equal to, 85 wt %, further less than, or equal to, 80 wt %, based on the weight of the oil, of one or more paraffinics.

The invention also provides a composition, comprising at least one ethylene-based polymer and at least one oil, formed by an inventive process as described herein.

The inventive composition may comprise a combination of two or more embodiments described herein.

In one embodiment, the composition has a weight average molecular weight (Mw) greater than, or equal to, 100,000 g/mole, further greater than, or equal to 120,000 g/mole, further greater than, or equal to 150,000 g/mole, further greater than, or equal to 180,000 g/mole, greater than, or equal to 190,000 g/mole, further greater than, or equal to 200,000 g/mole.

In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a weight average molecular weight (Mw) less than, or equal to, 1,000,000 g/mole, further less than, or equal to, 800,000 g/mole, further less than, or equal to, 500,000 g/mole. In a further embodiment, the ethylene-based polymer is an ethylene/α-olefin interpolymer, and further an ethylene/α-olefin/non-conjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a MWD less than, or equal to, 4.0, further less than, or equal to, 3.8, further less than, or equal to 3.5. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a MWD greater than, or equal to, 1.6, further greater than, or equal to, 1.8, further greater than, or equal to 2.0. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a Mooney Viscosity (ML1+4, 125° C.) greater than, or equal to, 10, further greater than, or equal to, 15, further greater than, or equal to, 20. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a Mooney Viscosity (ML1+4, 125° C.) less than, or equal to, 300, further less than, or equal to, 250, further less than, or equal to, 200, further less than, or equal to, 150. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition comprises from 35 to 80 weight percent ethylene, further from 38 to 75 weight percent ethylene, and further from 40 to 70 weight percent ethylene, based on the weight of the composition. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition comprises from 1.0 to 9.0 weight percent polyene, further from 1.5 to 8.5 weight percent polyene, and further from 2.0 to 8.0 weight percent polyene, based on the weight of the composition. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a rheology ratio (V0.1/V100 at 190° C.) greater than, or equal to, 20, further greater than, or equal to, 22. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a rheology ratio (V0.1/V100 at 190° C.) less than, or equal to, 80, further less than, or equal to, 75, further less than, or equal to, 70. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a viscosity (0.1 rad/sec at 190° C.) greater than, or equal to, 20,000 Pa·s, further greater than, or equal to, 25,000 Pa·s. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/ diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition has a viscosity (0.1 rad/sec at 190° C.) less than, or equal to, 200,000 Pa·s, further less than, or equal to, 180,000 Pa·s. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the incorporated oil is present in an amount greater than, or equal to, 10 wt %, further greater than, or equal to, 12 wt %, further greater than, or equal to, 14 wt %, based on the weight of the composition. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the incorporated oil is present in an amount less than, or equal to, 70 wt %, further greater than, or equal to, 60 wt %, further greater than, or equal to, 55 wt %, based on the weight of the composition. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB). In another embodiment, the composition comprises two ethylene-based polymers; and further each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In a one embodiment, the composition comprises one ethylene-based polymer. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM), and further an ethylene/propylene/diene terpolymer (EPDM). In a further embodiment, the ethylene-based polymer is present in an amount from 30 to 90 wt %, further from 40 to 90 wt %, based on the weight of the composition.

In another embodiment, the composition comprises two ethylene-based polymers. In a further embodiment, each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB). In a further embodiment, the two ethylene-based polymers are present in a sum amount from 30 to 90 wt %, further from 40 to 90 wt %, based on the weight of the composition.

In one embodiment, the composition comprises one ethylene-based polymer. In a further embodiment, the composition comprises, based on the weight of the composition, greater than, or equal to, 60 wt %, further greater than, or equal to, 70 wt %, further greater than, or equal to, 80 wt %, of the sum weight of the oil and the ethylene-based polymer. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB).

In one embodiment, the composition comprises one ethylene-based polymer. In a further embodiment, the composition comprises, based on the weight of the composition, greater than, or equal to, 90 wt %, further greater than, or equal to, 95 wt %, further greater than, or equal to, 99 wt %, of the sum weight of the oil and the ethylene-based polymer. In a further embodiment, the ethylene-based polymer is an ethylene/α-olefin interpolymer, and further an ethylene/α-olefin/nonconjugated polyene interpolymer, and further an ethylene/α-olefin/diene interpolymer (EAODM). In a further embodiment, the interpolymer is an ethylene/-propylene/diene terpolymer (EPDM). In a further embodiment, the diene is 5-ethylidene-2-norbornene (ENB).

In one embodiment, the composition comprises two ethylene-based polymers. In a further embodiment, the composition comprises, based on the weight of the composition, greater than, or equal to, 60 wt %, further greater than, or equal to, 70 wt %, further greater than, or equal to, 80 wt %, of the sum weight of the oil and the two ethylene-based polymers. In a further embodiment, each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

In one embodiment, the composition comprises two ethylene-based polymers. In a further embodiment, the composition comprises, based on the weight of the composition, greater than, or equal to, 90 wt %, further greater than, or equal to, 95 wt %, further greater than, or equal to, 99 wt %, of the sum weight of the oil and the two ethylene-based polymers. In a further embodiment, each polymer is, independently, an ethylene/α-olefin interpolymer, and further an ethylene/α-olefin/nonconjugated polyene interpolymer, and further an ethylene/α-olefin/diene interpolymer (EAODM). In a further embodiment, each interpolymer is, independently, an ethylene/propylene/diene terpolymer (EPDM). In a further embodiment, the diene is 5-ethylidene-2-norbornene (ENB).

For those compositions comprising two ethylene-based polymers, as described above, each polymer differs from the other in one or more properties, including, but not limited to, Mooney viscosity, Mw, Mn, MWD, V0.1, rheology ratio (V0.1/V100), ethylene content, and/or polyene content.

In one embodiment, an inventive composition further comprises at least one stabilizer. Suitable stabilizers include, but are not limited to, AO and UV stabilizers.

In one embodiment, the at least one stabilizer is present in an amount from 0.1 to 1 weight percent, based on the weight of the composition The inventive composition may comprise a combination of two or more embodiments described herein.

The invention also provides an article comprising at least one component formed from an inventive composition described herein. In a further embodiment, the article is selected from the group consisting of profiles, injection molded parts, gaskets, shoe components and tubes.

An inventive article may comprise a combination of two or more embodiments as described herein.

Ethylene-Base Polymer(s)

In one embodiment, the composition comprises one ethylene-based polymer. In a further embodiment, the ethylene-based polymer is an ethylene/α-olefin interpolymer.

In one embodiment, the composition comprises two ethylene-based polymers. In a further embodiment, each ethylene-based polymer is, independently, an ethylene/α-olefin Interpolymer.

The following embodiments apply to one ethylene-based polymer, or to two ethylene-based polymers.

An ethylene/α-olefin interpolymer for the inventive compositions described herein, comprise, in polymerize form, ethylene, an α-olefin, and, optionally, a polyene and further a non-conjugated polyene. Suitable examples of α-olefins include the C3-C20 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, each ethylene/α-olefin interpolymer, independently, comprises a majority amount of polymerized ethylene, based on the weight of the interpolymer. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a molecular weight distribution (Mw/Mn) from 1.7 to 4.5, or from 1.9 to 4.0, or from 2.0 to 3.5. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin/nonconjugated polyene interpolymer has a Mooney viscosity, ML(1+4) at 125° C., greater than, or equal to, 10, or greater than, or equal to, 15, or greater than, or equal to 20, or greater than, or equal to 25. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin/nonconjugated polyene interpolymer has a Mooney viscosity, ML(1+4) at 125° C., less than 300, or less than, or equal to, 200, or less than, or equal to, 150, or less than, or equal to 100. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

The Mooney viscosity for the ethylene-based polymer is that of the neat polymer (or calculated viscosity of neat polymer for polymers that contain a filler, such as carbon black, and/or an oil). The neat polymer refers to the polymer without filler and without oil.

In one embodiment, each ethylene/α-olefin interpolymer has a number average molecular weight (Mn) greater than, or equal to, 50,000 g/mole, further greater than, or equal to 60,000 g/mole, further greater than, or equal to 70,000 g/mole, further greater than, or equal to, 80,000 g/mole. In a further embodiment, each ethylene/α-olefin interpolymer is an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a number average molecular weight (Mn) less than, or equal to, 350,000 g/mole, further less than, or equal to, 300,000 g/mole, further less than, or equal to, 200,000 g/mole, further less than, or equal to, 100,000 g/mole. In a further embodiment, each ethylene/α-olefin interpolymer is an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a weight average molecular weight (Mw) less than, or equal to, 700,000 g/mole, further less than, or equal to, 600,000 g/mole, further less than, or equal to, 500,000 g/mole. In a further embodiment, each ethylene/α-olefin interpolymer is an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a weight average molecular weight (Mw) greater than, or equal to, 100,000 g/mole, further greater than, or equal to 120,000 g/mole, further greater than, or equal to 130,000 g/mole, further greater than, or equal to, 150,000 g/mole, further greater than, or equal to, 170,000 g/mole. In a further embodiment, each ethylene/α-olefin interpolymer is an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a molecular weight distribution (MWD) greater than, or equal to, 1.8, further greater than, or equal to 1.9, further greater than, or equal to 2.0. In a further embodiment, each ethylene/α-olefin interpolymer is an ethylene/α-olefin/polyene interpolymer, and further an ethylene/α-olefin/diene interpolymer. In a further embodiment, the each interpolymer is, independently, an EPDM terpolymer. In a further embodiment, the diene is ENB.

In one embodiment, each ethylene/α-olefin interpolymer has a molecular weight distribution (MWD) less than, or equal to, 3.0, further less than, or equal to, 2.7, further less than, or equal to, 2.5. In a further embodiment, each ethylene/α-olefin interpolymer is an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

An ethylene-based polymer may comprise a combination of two or more embodiments as described herein.

An ethylene/alpha-olefin interpolymer may comprise a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; mineral oils, vegetable oils, such as castor, tall, rapeseed, and soybean oils and esters and epoxidized derivatives thereof; and the like.

In one embodiment, the oil is present in an amount from 5 to 70 weight percent, further from 5 to 60 weight percent, further from 5 to 50 weight percent, based on the weight of the composition.

In one embodiment, the oil is present in an amount from 10 to 70 weight percent, further from 10 to 60 weight percent, further from 10 to 55 weight percent, based on the weight of the composition.

An oil may comprise a combination of two or more embodiments as described herein.

Additives

An inventive composition may comprise one or more additional additives. Suitable additives include, but are not limited to, crosslinking agents, fillers, antioxidants, UV stabilizers, flame retardants, colorants or pigments, foaming agents and combinations thereof.

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin interpolymer," as used herein, refers to a polymer that comprises, in polymerized form, a majority weight percent of ethylene (based on the weight of the interpolymer), and at least one α-olefin.

The term "ethylene/α-olefin/polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term "incorporated oil," as used herein, refers to oil contained within the ethylene-based polymer.

The term "oil" is known in the art, and typically refers to viscous liquid with increased viscosity, as compared to that of water at the same temperature and pressure, and which oil is typically derived from petroleum. The oil typically provides lubrication and reduced friction between moving surfaces of rotational and/or reciprocating mechanisms. The oil can consist of single or multiple components. Additives might be added to improve lubricity, flow properties, thermal stability, and/or other properties. Examples of suitable oils include mineral oils.

The term "mixture," as used herein, in reference to a polymerization process, refers to a composition comprising components of the polymerization (for example, monomer, comonomer(s), solvent, etc.).

The term "reactor system," as used herein, refers to the components (devices) used to polymerize and/or isolate a polymer. Such components/devices include, but are not limited to, one or more reactors, one or more mixers, one or more devolatization units, and one or more exchangers.

The term "mixer," as used herein, in reference to a polymerization process, refers to a device that comprises one or more mixing elements. Mixing elements include, but are not limited to, those elements configured to divide and diverge the effluent entering the mixer.

The term "downstream," as used herein, in reference to a reactor system, refers to the location of a polymerization device or isolation device that is located after another device.

The term "upstream," as used herein, in reference to a reactor system, refers to the location of a polymerization device or isolation device that is located prior to another device.

The term "stirred tank reactor," as used herein, refers to a pressure reactor vessel containing one or more rotating agitators, and/or one or more impellers, on a central agitator shaft, and which are used to mix the reactor contents. Typically, one or more feed streams introduce the reactants into the reactor, and an exit stream is used to withdraw the "reactor effluent." Typically, one or more baffles are often installed on the wall of the reactor to improve the quality of mixing. Stirred tank reactors are often jacketed to allow limited addition or removal of heat, but the amount of heat transfer area is small relative to other reactor designs, and thus, stirred tank reactors operate principally adiabatically, particularly at a large industrial scale polymerizations. Some stirred tank reactors may contain cooling coils (for example, see U.S. Pat. No. 2,875,027) to aid in the remove of the heat of polymerization. Others may be operated with a gas phase containing a condensable vapor, and use condensation to remove heat (see, for example, U.S. Pat. No. 3,968,090).

The term "loop reactor," as used herein, refer to a reactor that comprises a flow loop configuration. Loop reactors for solution polymerization are well described in U.S. Pat. No. 5,977,251. These reactors are characterized by a recycling flow loop, where a pump is used to recirculate the flow of the polymerization solution through one or more heat exchangers, which remove the heat of polymerization, and also through static and/or dynamic mixing elements, which help homogenize the polymerization solution. Typically, solvent and monomer feeds are introduced at one or more points within the loop, using various types of feed injectors. Typically, one or more catalyst components are introduced, in a similar fashion, via one or more catalyst injectors. Static mixers are frequently used downstream of each feed or catalyst injector, to improve mixing of these feed streams into the bulk fluid. At some point within the loop, an exit stream removes the reactor effluent, which is sent, in turn, to subsequent reactors, or to the devolatilization section of the isolation process.

The term "solution polymerization," as used herein, refers to a polymerization process, in which the formed polymer is dissolved in the polymerization solvent.

The term "continuous solution polymerization," as used herein refers to a solution polymerization, in which monomer, solvent, and catalyst feeds are continually added to a reactor (for example, stirred tank, loop, pipe flow, etc.). Reactor effluent comprising polymer, solvent, catalysts and unreacted monomers, is continually removed from the reactor. By dividing the volume of the reactor, by the average volumetric flow rate through the reactor, one can calculate the residence time, which is the average time a discrete quantity of reactor feed spends inside the reactor. Continuous solution polymerization is distinct from batch polymerization, where the feeds are introduced prior to polymerization, and the reactor contents are removed at or near the end of polymerization. Semi-batch polymerization is similar to batch polymerization, but some feeds of monomer or catalyst may be continually added during the course of polymerization, while the reactor contents are again removed at or near the end of the polymerization.

The term "polymer solution," as used herein, refers to the complete dissolution of polymer in one or more solvents (typically much lower in molecular weight than polymer) to form a homogeneous (most often in liquid state) phase. The solution comprises the polymer and solvent, and may also comprise unreacted monomers and other residuals of the polymerization reaction.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The term "adiabatic reactor," as used herein, refers to a reactor which has no active heat removal mechanism and no active heat addition mechanism.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods
Volatile Fraction—Oil Analysis

The volatile fractions of an oil are determined according to ASTM D7169. The detector response is checked (see section 8.5 of ASTM D7169). Gas Chromatographic conditions are listed in Table 1 of ASTM D7169. Column=100% bonded polydimethylsiloxane column having a nominal inside diameter of 0.5 mm and a film thickness of 0.09 to 0.17 μm is used. Injection volume of 1.0 μL. Solvent is $CS_2$.

A POLYWAX standard (P655 or P1000) plus C7-C20 alkanes are used to generate the calibration curve (Detector response versus retention time) and to verify the chromatogram against Figure A.1.2 of the standard. Gas Chromatographic conditions listed in Table 1 of ASTM D7169. Column=100% bonded polydimethylsiloxane column having a nominal inside diameter of 0.5 mm and a film thickness of 0.09 to 0.17 μm is used. Injection volume of 1.0 μL. Solvent is $CS_2$. See sections 8.3-8.4 of ASTM D7169.

Each oil is run using the GC conditions above, to obtain a chromatogram (detector response versus retention times) for the oil. About 70-80 mg oil in about 4.9 g solvent is used as the chromatography sample. A computer software (for example, SimDis from Agilent) converts retention times to respective carbon numbers, and converts detector response to weight fraction of the oil, to generate a "weight fraction versus carbon number" profile. The computer software converts carbon number to boiling point. The results can be checked against Table 3 of ASTM D7169.

Figure 1:
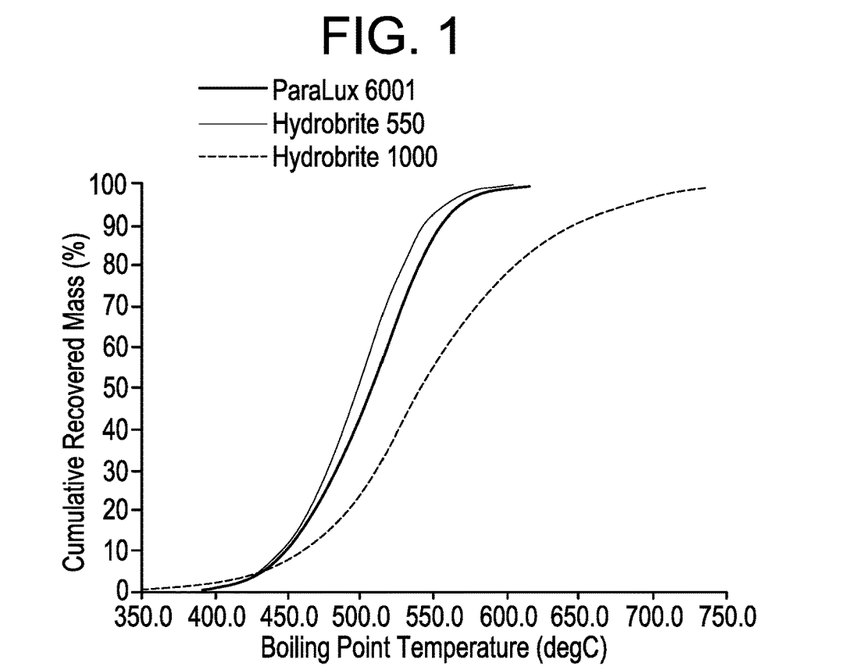
FIG. 1 depicts the "Cumulative Recovered Mass (%) versus Boiling Point Temperature" for three oils.
Figure 2:
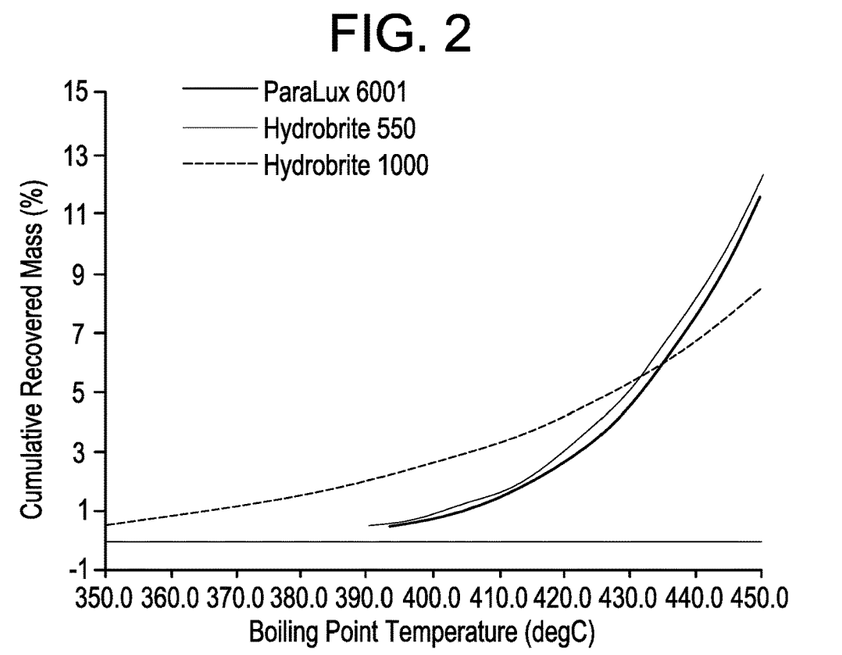
FIG. 2 depicts an expanded region (BP from 350° C. to 450° C.) of FIG. 1.

A reference standard (ASTM D6352/D7169 Reference Material 5010, available from Sigma-Aldrich) is run to verify the boiling point distribution of the oil sample. A computer software (for example, SimDis from Agilent) converts weight fraction of oil to "cumulative recovery mass (%)." Generate a "cumulative recovery mass (%) versus boiling point" profile. See FIGS. 1 and 2. FIG. 2 depicts an expanded region of FIG. 1.

Mooney Viscosity

The Mooney viscosity of the polymer [ethylene/α-olefin/nonconjugated polyene interpolymer (e.g., EPDM) with no filler and no oil), Mooney Viscosity (ML1+4 at 125° C.)], is measured in accordance with ASTM 1646-04, with a one minute preheat time and a four minute rotor operation time. The instrument is an Alpha Technologies Rheometer MDR 2000.

Mooney viscosity of the composition comprising the polymer(s) and the oil(s), Mooney Viscosity (ML1+4 at 125° C.), is measured in accordance with ASTM 1646-04, with a one minute preheat time and a four minute rotor operation time. The instrument is an Alpha Technologies Rheometer MDR 2000.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D9300 for its ethylene content, and ASTM D6047 for its ethylidene-norbornene or dicyclopentadiene content.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation is used to estimate the RR of a polymer ($RR_{polymer}$) from the RR value of a polymer containing oil ($RR_{OE\_Polymer}$). $RR_{Polymer} = RR_{OE\_Polymer}/(wt\% \text{ oil}*(-0.01988)+1.0321)$.

Melt Index

Melt index (I2, or MI) of an ethylene-based polymer is measured in accordance with ASTM D-1238, condition 190° C./2.16 kg.

Density

Density is measured in accordance with ASTM D-792.

Experimental

Reagents

All solvents and monomers are first purified using adsorption beds to remove potential catalyst poisons.

The solvent was ISOPAR E.

CAT A: Hafnium, dimethyl[[2',2'''-[1,3-propanediylbis(oxy-.kappa.O)]bis[3-[3,6-bis(1,1-dimethylethyl)-9H-carbazol-9-yl]-5'-fluoro-5-(1,1,3,3-tetramethylbutyl)[1,1'-biphenyl]-2-olato-.kappa.O]](2-)]-, (OC-6-33)-.

(CAT B)

(CAT C)

Cocatalysts

Cocat 1: (bis-hydrogenatedtallowalkylmethylammonium tetrakis-pentafluorophenylborate)—Supplied by Boulder Scientific.

Cocat2: (modified methaluminoxane) (MMAO-3A)—Supplied by Akzo-Nobel.

The oils are listed in Table 1.

(CAT A)

TABLE 1

| | | Oils | | | | |
|---|---|---|---|---|---|---|
| Oil | Kinematic Viscosity at 40° C. (ASTM D 445) | Volatile Fraction at 400° C.; atm pressure (ASTM D7169) | Volatile Fraction at 425° C.; atm pressure (ASTM D7169) | Volatile Fraction at 500° C.; atm pressure (ASTM D7169) | Amount of Naphthenics (wt %) | Amount of Paraffinics (wt %) |
| PARALUX 6001 | 116 mm²/sec 116 cSt | 0.81 wt % | 3.5 wt % | 44 wt % | 30 | 70 |
| HYDROBRITE 550 | 100-125 mm²/sec 113 cSt | 0.90 wt % | 3.8 wt % | 52 wt % | 30 | 70 |
| HYDROBRITE 1000 | 180-240 mm²/sec | 2.56 wt % | 5.6 wt % | 25 wt % | | |

Each wt % based on the total weight of the oil.

Polymerizations

Example 1: CSTR

Figure 3:
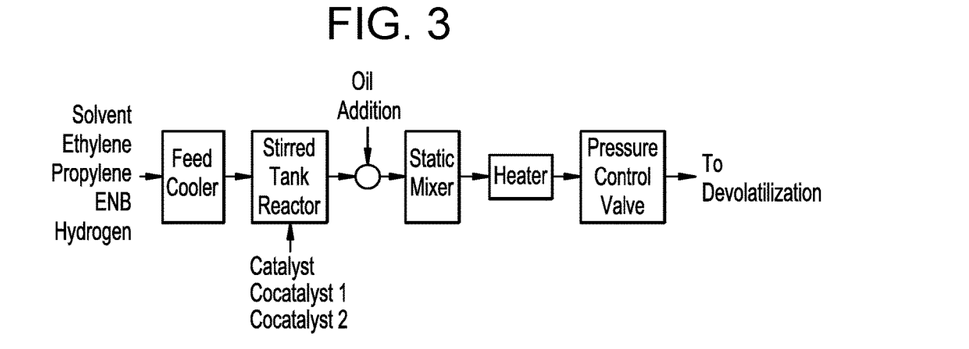
FIG. 3 depicts a schematic of a reactor system for a polymerization using a stirred tank reactor.

The polymerization process was depicted in FIG. 3. The process conditions are shown in Tables 2A and 2B, as Example 1, and product properties are shown in Table 3. The reactive monomers ethylene, propylene, and ENB, along with solvent (ISOPAR E) and hydrogen, in one feed, were fed to a jacketed and stirred tank reactor, through a feed cooler. Three catalyst components (catalyst and cocatalyst(s)) were fed to the reactor, separately from the other feeds. PARALUX 6001 oil was added to the CSTR outlet stream. The combined stream was then sent through a static mixer, a heater, and through a pressure control valve, and then to the devolatilization section of the reactor system.

Example 2: CSTR—Loop

Figure 4:
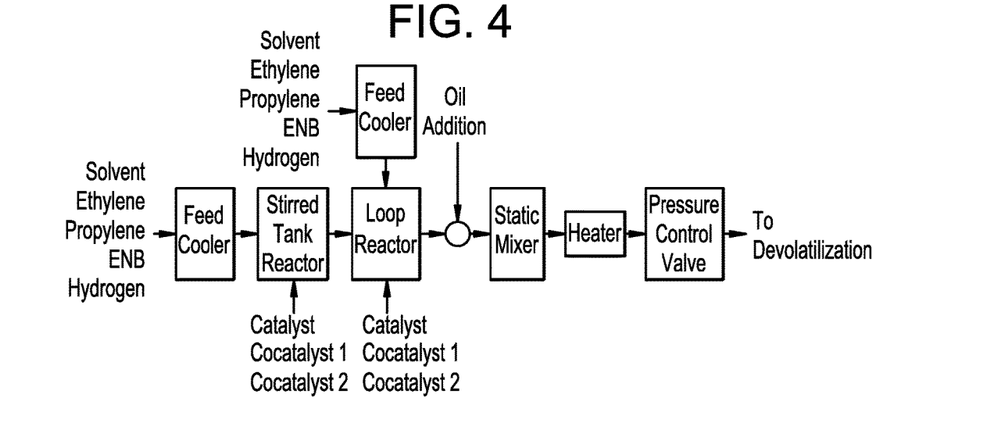
FIG. 4 depicts a schematic of a reactor system for a polymerization using a stirred tank reactor followed by a loop reactor.

The polymerization process is depicted in FIG. 4. The process conditions are shown in Tables 2A and 2B, as Example 2, and product properties are shown in Table 3. The reactive monomers ethylene, propylene, and ENB, along with solvent (ISOPAR E) and hydrogen, were fed, in one feed, to a jacketed and stirred tank reactor (CSTR), through a feed cooler. Three catalyst components (catalyst and cocatalyst(s)) were fed to the CSTR, separately from the other feeds. The outlet of the CSTR was sent to a Loop reactor, along with additional chilled solvent (ISOPAR E), ethylene, propylene, ENB, and hydrogen. Three catalyst components (catalyst and cocatalyst(s)) were added to the Loop reactor, separately from the other feeds. PARALUX 6001 oil was added to the outlet stream of the Loop reactor, prior to a static mixer, which in turn, was followed by a heater and a pressure control valve, and then the devolatilization section of the reactor system.

Example 3: Loop—CSTR

Figure 5:
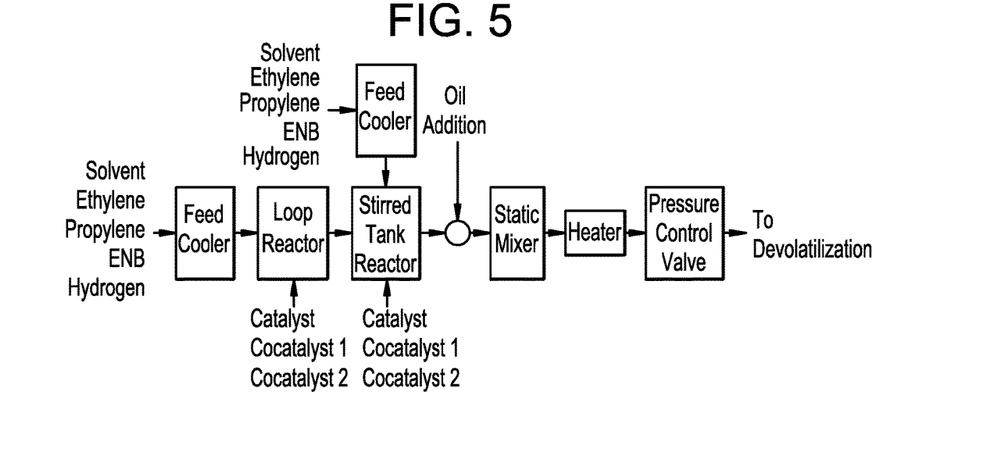
FIG. 5 depicts a schematic of a reactor system for a polymerization using a loop reactor followed by a stirred tank reactor.

The polymerization process is depicted in FIG. 5. The process conditions are shown in Tables 2A and 2B, as Example 3, and product properties are shown in Table 3. The reactive monomers ethylene, propylene, and ENB, along with solvent (ISOPAR E) and hydrogen, were fed, in one feed, to a Loop reactor through a feed cooler. Three catalyst components (catalyst and cocatalyst(s)) were fed to the Loop reactor, separately from the other feeds. The outlet of the Loop reactor was sent to a CSTR, along with additional chilled solvent, ethylene, propylene, ENB, and hydrogen. Three catalyst components (catalyst and cocatalyst(s)) were fed to the CSTR reactor, separately from the other feeds. PARALUX 6001 oil was added to the outlet stream of the CSTR reactor. The combined stream was then sent through a static mixer, heater, pressure control valve, and then to the devolatilization section of the reactor system.

Example 4: Loop

Figure 6:
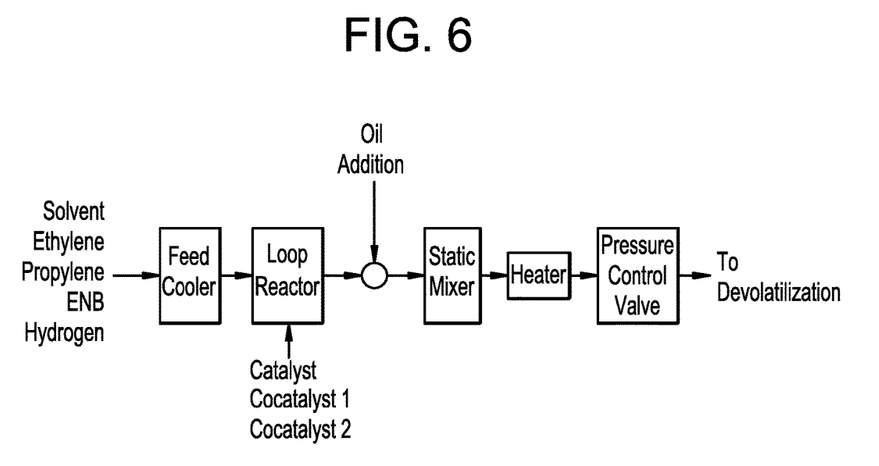
FIG. 6 depicts a schematic of a reactor system for a polymerization using a loop reactor.

This polymerization process is depicted in FIG. 6. The process conditions are shown in Tables 2A and 2B, as Example 4, and product properties are shown in Table 3. The reactive monomers ethylene, propylene, and ENB, along with solvent (ISOPAR E) and hydrogen, were fed, in one feed, to a "27 gallon" Loop reactor through a feed cooler. Three catalyst components (catalyst and cocatalyst(s)) were fed to the reactor, separately from the other feeds. PARALUX 6001 oil was added to the Loop reactor outlet stream. The combined stream was then sent through a static mixer, heater, pressure control valve, and then to the devolatilization section of the reactor system.

Example 5: Loop—Loop

Figure 7:
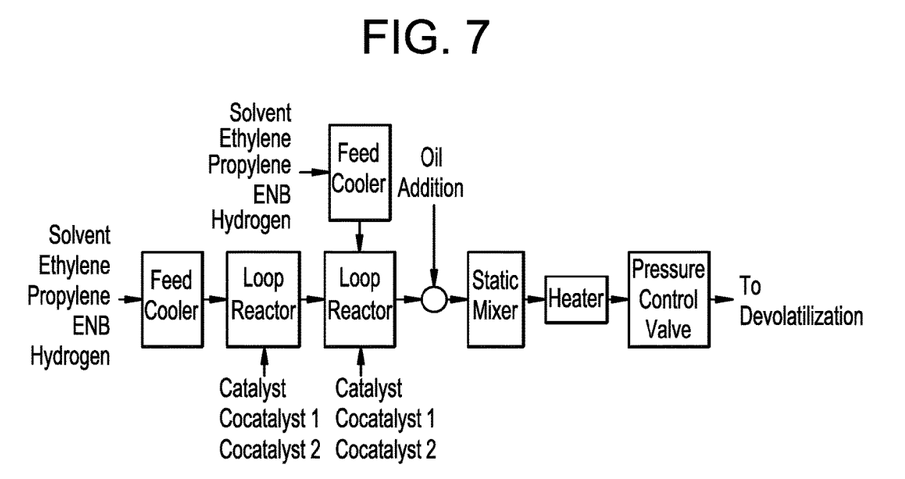
FIG. 7 depicts a schematic of a reactor system for a polymerization using two loop reactors in series.

This polymerization process is depicted in FIG. 7. The process conditions are shown in Tables 2A and 2B, as Example 5, and product properties are shown in Table 3. The reactive monomers ethylene, propylene, and ENB, along with solvent (ISOPAR E) and hydrogen, were fed, in one feed, to a Loop reactor, through a feed cooler. Three catalyst components (catalyst and cocatalyst(s)) were fed to the Loop reactor, separately from the other feeds. The outlet of the Loop reactor was sent to a second Loop reactor, along with additional chilled solvent, ethylene, propylene, ENB, and hydrogen. Three catalyst components (catalyst and cocatalyst(s)) were fed to the CSTR reactor, separately from the other feeds. PARALUX 6001 oil was added the outlet stream of the second reactor. The combined stream was then sent through a static mixer, heater, pressure control valve, and then to the devolatilization section of the reactor system.

Example 6: Loop—Loop

This polymerization process is depicted in FIG. 7. The process conditions are shown in Tables 2A and 2B, as Example 6, and product properties are shown in Table 3. The reactive monomers ethylene, propylene, and ENB, along with solvent (ISOPAE E) and hydrogen, were fed, in one feed, to a Loop reactor, through a feed cooler. Three catalyst components (catalyst and cocatalyst(s)) were fed to the Loop reactor, separately from the other feeds. The outlet of the Loop reactor was sent to a second Loop reactor, along with additional chilled solvent, ethylene, propylene, ENB, and hydrogen. Three catalyst components (catalyst and cocatalyst(s)) were fed to the CSTR reactor, separately from the other feeds. HYDROBRITE 1000 oil was added to the outlet stream of the second reactor. The combined stream was then sent through a static mixer, heater, pressure control valve, and then to the devolatilization section of the reactor system.

Example 7: Loop

This polymerization process is depicted in FIG. 6. The process conditions are shown in Tables 2A and 2B, as Example 7, and product properties are shown in Table 3. The reactive monomers ethylene, propylene, and ENB, along with solvent (ISOPAR E) and hydrogen, were fed, in one feed, to a Loop reactor through a feed cooler. Three catalyst components (catalyst and cocatalyst(s)) were fed to the reactor, separately from the other feeds. HYDROBRITE 550 oil was added to the Loop reactor outlet stream. The combined stream was then sent through a static mixer, heater, pressure control valve, and then to the devolatilization section of the reactor system.

Example 8: CSTR

This polymerization process is depicted in FIG. 3. The process conditions are shown in Tables 2A and 2B, as Example 8, and product properties are shown in Table 3. The reactive monomers ethylene, propylene, and ENB, along with solvent (ISOPAE E) and hydrogen, were fed, in one feed, to a jacketed and stirred tank reactor, through a feed cooler. Three catalyst components (catalyst and cocatalyst(s)) were fed to the reactor, separately from the other feeds. HYDROBRITE 550 oil was added to the CSTR outlet stream. The combined stream was then sent through a static mixer, a heater, and through a pressure control valve and then to the devolatilization section of the reactor system.

Polymer properties are shown in Tables 3 and 4. As seen in the Tables 1-4 below, the inventive polymerizations can be used to effectively produce oil-extended, high molecular weight polymers. Oils, rich in low molecular weight components, generate high concentrations of oil in the vacuum solvent. Despite being the heaviest of all the oils considered, HYDROBRITE 1000 produces the highest concentrations (wt %) of low molecular weight components, at 400° C. (atm) and 425° C. (atm), than PARALUX 6001 and HYDROBRITE 550 (see the volatile fractions at 400° C. and 425° C., each atm pressure). Of the three oils considered here, PARALUX 6001 is the most appropriate. PARALUX 6001 has the lowest concentration of low molecular weight components or fraction (wt %) at these temperatures, and thus, is a preferred oil. These lower molecular weight components can inadvertently be recycled back to the polymerization process, during the isolation of the oil-extended polymer, and thus, can result in undesirable reactions and/or other undesirable effects during the polymerization process.

TABLE 2A

Polymerization Conditions

| | Example # | | | | | | | |
|---|---|---|---|---|---|---|---|---|
| | 1 | 2 | 3 | 4 | 5 | 6 | 7 | 8 |
| Catalyst | CAT A | CAT C | CAT A | CAT A | CAT B | CAT B | CAT A | CAT A |
| First Cocatalyst | Cocat 1 | Cocat 1 | Cocat 1 | Cocat 1 | Cocat 1 | Cocat 1 | Cocat 1 | Cocat 2 |
| Second Cocatalyst | Cocat 2 | Cocat 2 | Cocat 2 | Cocat 2 | Cocat 2 | Cocat 2 | Cocat 2 | Cocat 2 |
| Reactor Configuration | CSTR | CSTR-Loop | Loop-CSTR | Loop | Loop-Loop | Loop-Loop | Loop | CSTR |
| First Reactor Temp. [C.] | 101 | 98 | 120 | 120 | 83 | 84 | 106 | 140 |
| First Reactor Pressure [psig] | 657 | 697 | 577 | 525 | 525 | 526 | 548 | 542 |
| First Reactor Solvent Flow [lb/hr] | 181.7 | 122.5 | 69.5 | 173.0 | 240.0 | 140.0 | 250.0 | 38.7 |
| First Reactor Hydrogen Flow [sccm] | 39 | 29 | 661 | 276 | 163 | 349 | 458 | 15 |
| First Reactor Mon.(C2) Flow [lb/hr] | 16.1 | 8.8 | 8.7 | 16.4 | 13.5 | 13.0 | 28.9 | 3.0 |
| First Reactor Comon. (C3)Flow [lb/hr] | 18.1 | 9.0 | 6.2 | 17.7 | 16.9 | 14.2 | 29.3 | 5.6 |
| First Reactor ENB Flow [lb/hr] | 4.0 | 2.9 | 1.1 | 5.2 | 3.0 | 2.9 | 6.2 | 1.0 |
| Oil Flow [lb/hr] | 16.3 | 13.5 | 5.0 | 4.7 | 14.9 | 7.6 | 10.4 | 0.6 |
| First Reactor Mon. (C2) Conv. [%] | 52.1 | 58.3 | 76.5 | 81.5 | 69.7 | 67.6 | 68.6 | 65.0 |
| First Reactor Production Rate [lb/hr] | 15.9 | 9.9 | 10.4 | 27.0 | 20.7 | 17.8 | 25.4 | 3.2 |
| First Reactor log viscosity [log (cp)] | 3.88 | 3.82 | 2.60 | 2.51 | 2.75 | 3.26 | 3.05 | 2.14 |
| First Rnx, Catalyst Flow [PPH] | 0.58 | 0.49 | 0.34 | 1.13 | 0.75 | 0.59 | 0.37 | 0.08 |
| First Rnx, Catalyst Conc. [PPM] | 30 | 50 | 25 | 50 | 23 | 23 | 75 | 74 |
| First Rnx, First Cocatalyst Flow [PPH] | 0.21 | 0.53 | 0.32 | 1.52 | 1.04 | 0.82 | 0.44 | 0.06 |
| First Rnx, First Cocatalyst Conc. [PPM] | 819 | 600 | 350 | 500 | 500 | 500 | 500 | 74 |
| First Rnx, Second Cocatalyst Flow [PPH] | 0.38 | 0.33 | 0.39 | 1.53 | 0.49 | 0.39 | 0.66 | 0.08 |
| First Rnx, Second Cocatalyst-2 conc [PPM] | 273 | 391 | 98 | 195 | 98 | 98 | 127 | 130 |

TABLE 2B

Polymerization Conditions Continued

| | Example # | | | | | | | |
|---|---|---|---|---|---|---|---|---|
| | 1 | 2 | 3 | 4 | 5 | 6 | 7 | 8 |
| Catalyst | CAT A | CAT C | CAT A | CAT A | CAT B | CAT B | CAT A | CAT A |
| First Cocatalyst | Cocat 1 | Cocat 1 | Cocat 1 | Cocat 1 | Cocat 1 | Cocat 1 | Cocat 1 | Cocat 1 |
| Second Cocatalyst | Cocat 2 | Cocat 2 | Cocat 2 | Cocat 2 | Cocat 2 | Cocat 2 | Cocat 2 | Cocat 2 |
| Reactor Configuration | CSTR | CSTR-Loop | loop-CSTR | Loop | Loop-Loop | Loop-Loop | Loop | CSTR |
| Second Reactor Temp. [C.] | — | 150 | 131 | — | 103 | 103 | — | — |
| Secondary Reactor Pressure [psig] | — | 653 | 600 | — | 523 | 523 | — | — |
| Secondary Reactor Solvent Flow [lb/hr] | — | 67.8 | 110.5 | — | 180.2 | 134.6 | — | — |
| Secondary Reactor Hydrogen Flow [sccm] | — | 299 | 609 | — | 365 | 549 | — | — |
| Second Reactor Mon. Flow [lb/hr] | — | 8.4 | 12.2 | — | 12.1 | 11.9 | — | — |
| Second Reactor Comon. Flow [lb/hr] | — | 12.9 | 6.6 | — | 13.8 | 12.6 | — | — |
| Second Reactor ENB Flow [lb/hr] | — | 2.2 | 2.1 | — | 2.2 | 2.4 | — | — |
| Second Reactor Mon. (C2) Conv. [%] | — | 63.5 | 53.0 | — | 68.4 | 63.5 | — | — |
| Second Reactor log viscosity [log (cp)] | — | 2.92 | 3.23 | — | 2.36 | 2.69 | — | — |
| Second Reactor Production Rate [lb/hr] | — | 15.3 | 11.1 | — | 20.0 | 17.1 | — | — |
| Second Catalyst Flow [PPH] | — | 0.51 | 0.48 | — | 0.96 | 0.65 | — | — |
| Second Rnx, Catalyst Conc. [PPM] | — | 50 | 25 | — | 23 | 23 | — | — |
| Second Rnx, First Cocatalyst Flow [PPH] | — | 0.57 | 0.46 | — | 0.33 | 0.22 | — | — |
| Second Rnx, First Cocatalyst-1Conc. [PPM] | — | 600 | 350 | — | 2000 | 2000 | — | — |
| Second Rnx, Second Cocatalyst-2 Flow [PPH] | — | 0.35 | 0.28 | — | 0.64 | 0.44 | — | — |
| Second Rnx, Second Cocatalyst conc. [PPM] | — | 391 | 98 | — | 98 | 98 | — | — |

TABLE 3

| Ex. | wt % Oil* | Oil Type | 2nd Reactor Mooney (without oil) (ML 1 + 4, 125° C.) | Overall Mooney$^a$ (with oil) (ML 1 + 4, 125° C.) | 2nd Reactor wt % Propylene | 2nd Reactor wt % ENB |
|---|---|---|---|---|---|---|
| 1 | 50.5 | PARALUX 6001 | | 42.2 | | |
| 2 | 34.8 | PARALUX 6001 | | 21.1 | | |
| 3 | 18.9 | PARALUX 6001 | 73.9 | | 26.0 | 4.9 |
| 4 | 14.8 | PARALUX 6001 | | 54.3 | | |
| 5 | 26.8 | PARALUX 6001 | | 39.9 | | |
| 6 | 17.9 | HYDROBITE 1000 | | 37.5 | | |
| 7 | 29.1 | HYDROBRITE 550 | | 44.3 | | |
| 8 | 15.6 | HYDROBRITE 550 | | 73.7 | | |

*wt % oil in polymer determined by mass balance: [oil flow (lb/hr)/(first reactor production rate (lb/hr) + second reactor production rate (lb/hr) + oil flow (lb/hr))] × 100.
$^a$Overall = ethylene-based polymer plus oil.

TABLE 4

| Ex. | wt % Oil* | Oil Type | Second Rnx Overall Wt. % Propylene | Second Rnx Overall wt. % ENB | Second Rnx Mn (g/mol) | Second Rnx Mw (g/mol) | Second Rnx Mw/Mn | Second Rnx V0.1 (190° C., 0.1 rad/sec) Pa · sec | Second Rnx V.1/V100 | Overall$^a$ (with oil) Mn (g/mol) | Overall$^a$ (with oil) Mw (g/mol) | Overall$^a$ (with oil) Mw/Mn | Overall$^a$ (with oil) V0.1 (190° C., rad/sec) Pa · sec | Overall$^a$ (with oil) V0.1/V100 |
|---|---|---|---|---|---|---|---|---|---|---|---|---|---|---|
| 1 | 50.5 | PARALUX 6001 | 30.2 | 2.4 | | | | | | 166,604 | 360,483 | 2.1 | 98,432 | 58.6 |
| 2 | 34.8 | PARALUX 6001 | 30.4 | 5.2 | | | | | | 83,089 | 261,565 | 3.1 | 27,344 | 24.6 |
| 3 | 18.9 | PARALUX 6001 | | | 142,941 | 312,756 | 2.2 | 149,450 | 31.5 | | | | | |
| 4 | 14.8 | PARALUX 6001 | 34.5 | 7.7 | | | | | | 81,032 | 215,219 | 2.7 | 169,350 | 62.3 |
| 5 | 26.8 | PARALUX 6001 | 35.2 | 6.1 | | | | | | 66,810 | 225,920 | 3.4 | NA | NA |
| 6 | 17.9 | HYDROBITE 1000 | 34.7 | 6.2 | | | | | | 62,730 | 186,730 | 3.0 | NA | NA |
| 7 | 29.1 | HYDROBRITE 550 | 27.4 | 5.0 | | | | | | 87,509 | 208,894 | 2.4 | 64,286 | 25.4 |
| 8 | 15.6 | HYDROBRITE 550 | 52.5 | 7.0 | | | | | | 81,680 | 282,880 | 3.5 | 163,910 | 56.5 |

*wt % oil in polymer determined by mass balance: [oil flow (lb/hr)/(first reactor production rate (lb/hr) + second reactor production rate (lb/hr) + oil flow (lb/hr))] × 100.
$^a$Overall = ethylene-based polymer plus oil.

The invention claimed is:

1. A process to form a composition comprising at least one ethylene-based polymer and at least one oil, said process comprising the following:

polymerizing a mixture comprising ethylene, and optionally one or more comonomers, in a reactor system, comprising at least one reactor and at least one mixer, located downstream from the reactor, to form the ethylene-based polymer; wherein the oil is added to the ethylene-based polymer upstream of the mixer, the oil has a volatile fraction, at 400° C. and atmospheric pressure, of less than or equal to 2.0 wt %, based on the total weight of the oil, the mixture further comprises a polymerization solvent, the reactor system comprises a line for recycled polymerization solvent, the recycled polymerization solvent is re-introduced into the at least one reactor, and the difference between the temperature of the oil and the temperature of at least one reactor ($T_{oil}-T_{reactor}$) is from 50° C. to 150° C.

2. The process of claim 1, wherein the mixer is a static mixer.

3. The process of claim 1, wherein the polymerization is a solution polymerization.

4. The process of claim 1, wherein the at least one reactor is a continuous stirred tank reactor or a Loop reactor.

5. The process of claim 1, wherein the reactor system comprises two reactors.

6. The process of claim 5, wherein the reactor system comprises a stirred tank reactor followed by a Loop reactor.

7. The process of claim 1, wherein the ethylene-based polymer is an ethylene/α-olefin interpolymer.

8. The process of claim 7, wherein the ethylene/α-olefin interpolymer is an ethylene/α-olefin/diene interpolymer.

9. A process to form a composition comprising at least one ethylene-based polymer and at least one oil, said process comprising the following:

polymerizing a mixture comprising ethylene, and optionally one or more comonomers, in a reactor system, comprising at least one reactor and at least one mixer, located downstream from the reactor, to form the ethylene-based polymer; wherein the oil is added to the ethylene-based polymer upstream of the mixer; and the difference between the temperature of the oil and the temperature of at least one reactor ($T_{oil}-T_{reactor}$) is from 50° C. to 150° C.

10. The process of claim 9, wherein:

the oil has a volatile fraction, at 400° C. and atmospheric pressure, less than or equal to, 2.0 wt %, based on the total weight of the oil, the mixture further comprises a polymerization solvent, the reactor system comprises a line for recycled polymerization solvent, and the recycled polymerization solvent is re-introduced into the at least one reactor.

11. The process of claim 9, wherein the reactor system comprises two reactors.

12. The process of claim 9, wherein the ethylene-based polymer is an ethylene/α-olefin interpolymer.

* * * * *